(12) United States Patent
Scoley et al.

(10) Patent No.: US 11,878,802 B2
(45) Date of Patent: Jan. 23, 2024

(54) AFT COMPLEX WITH PRM LAVATORY

(71) Applicant: SAFRAN CABIN INC., Huntington Beach, CA (US)

(72) Inventors: Ian Geoffrey Scoley, Huntington Beach, CA (US); Sandesh Shetty, Huntington Beach, CA (US); Scott Savian, Huntington Beach, CA (US)

(73) Assignee: Safran Cabin Inc., Huntington Beach, CA (US)

( * ) Notice: Subject to any disclaimer, the term of this patent is extended or adjusted under 35 U.S.C. 154(b) by 381 days.

(21) Appl. No.: 17/289,694

(22) PCT Filed: Oct. 29, 2019

(86) PCT No.: PCT/US2019/058499
§ 371 (c)(1),
(2) Date: Apr. 28, 2021

(87) PCT Pub. No.: WO2020/092325
PCT Pub. Date: May 7, 2020

(65) Prior Publication Data
US 2021/0403165 A1 Dec. 30, 2021

Related U.S. Application Data

(60) Provisional application No. 62/752,998, filed on Oct. 30, 2018.

(51) Int. Cl.
*B64D 11/02* (2006.01)
*B64D 11/00* (2006.01)

(52) U.S. Cl.
CPC .......... *B64D 11/02* (2013.01); *B64D 11/0023* (2013.01); *B64D 2011/0046* (2013.01)

(58) Field of Classification Search
CPC ................ B64D 11/02; B64D 11/0023; B64D 2011/0046; A47K 3/36; A47K 4/00;
(Continued)

(56) References Cited

U.S. PATENT DOCUMENTS 2,957,364 A * 10/1960 Villeple .............. F16H 61/0293
477/121
7,284,287 B2 * 10/2007 Cooper .................. B64D 11/02
4/664

(Continued)

OTHER PUBLICATIONS

Search Report issued in European Application 19877661.9.
Europe Patent Application No. 19877661.9, Intention to Grant, dated Jul. 7, 2023, 9 pages.

*Primary Examiner* — Medhat Badawi
(74) *Attorney, Agent, or Firm* — Kilpatrick Townsend & Stockton LLP

(57) ABSTRACT

A lavatory monument assembly that includes an enclosure having front and rear walls and that defines an enclosure interior. A divider wall that extends between the front and rear walls, and a divider door that is movable between closed and opened positions. In the closed position the divider door divides the enclosure interior into first and second lavatory interiors. The divider wall includes first and second sections and the divider door includes first and second portions that meet at an obtuse angle. The divider door is pivotably attached to the divider wall. The front wall includes first and second lavatory doors that are both movable between closed and opened positions and provide access to the first and second lavatory interiors. A first toilet is positioned adjacent the rear wall in the first lavatory interior and a second toilet is positioned adjacent the rear wall in the second lavatory interior.

14 Claims, 6 Drawing Sheets

(58) Field of Classification Search
CPC ..... E04H 1/1216; E04H 1/125; E06B 9/0638; B63B 29/14; Y10T 29/49716
See application file for complete search history.

(56) References Cited

U.S. PATENT DOCUMENTS

| | | | | |
|---|---|---|---|---|
| 7,866,603 | B2* | 1/2011 | Cooper | B64D 11/02 244/117 R |
| 7,984,875 | B2* | 7/2011 | Koehn | B64D 11/02 244/129.5 |
| 8,621,787 | B2* | 1/2014 | Barry | E04B 1/34869 52/79.8 |
| 8,672,267 | B2* | 3/2014 | Schliwa | B64D 11/04 244/118.6 |
| 8,720,827 | B2* | 5/2014 | Boren | E06B 3/921 296/146.13 |
| 8,944,377 | B2* | 2/2015 | McIntosh | B64G 1/60 244/118.5 |
| 9,045,231 | B2* | 6/2015 | Swain | E06B 9/0638 |
| 9,308,997 | B2* | 4/2016 | Scown | B64D 11/02 |
| 9,688,407 | B2* | 6/2017 | McIntosh | B64D 11/02 |
| 9,714,094 | B2* | 7/2017 | Ivester | B64D 11/02 |
| 2005/0125891 | A1* | 6/2005 | Stratmann | E04H 1/1216 4/661 |
| 2009/0065641 | A1* | 3/2009 | Koehn | B64D 11/02 244/129.5 |
| 2010/0237193 | A1* | 9/2010 | Yoshizaki | E06B 3/34 244/129.5 |
| 2012/0261509 | A1* | 10/2012 | Grant | B64D 11/02 4/664 |
| 2013/0206907 | A1* | 8/2013 | Burrows | B64D 11/02 244/118.5 |
| 2014/0077033 | A1* | 3/2014 | Scown | B64D 11/02 49/70 |
| 2014/0083012 | A1* | 3/2014 | Boren | B64D 11/02 49/176 |
| 2014/0123571 | A1* | 5/2014 | Swain | B64D 11/0023 29/401.1 |
| 2014/0291446 | A1* | 10/2014 | Reams | B64D 11/02 244/118.5 |
| 2014/0360099 | A1* | 12/2014 | McIntosh | E03D 11/00 29/401.1 |
| 2018/0031093 | A1* | 2/2018 | Seminel | F16H 25/2021 |
| 2018/0251222 | A1* | 9/2018 | Banfield | E04H 1/1216 |
| 2019/0127068 | A1* | 5/2019 | Scoley | B64D 11/02 |
| 2021/0403165 | A1* | 12/2021 | Scoley | E04H 1/125 |

* cited by examiner

AFT COMPLEX WITH PRM LAVATORY

CROSS REFERENCE TO RELATED APPLICATIONS

This application is a national stage application, filed under 35 U.S.C. § 371, of International Patent Application No. PCT/US19/58499 filed Oct. 29, 2019, which claims the benefit of U.S. Provisional Application No. 62/752,998, filed Oct. 30, 2018, the entireties of which are incorporated herein by reference.

FIELD OF THE INVENTION

The present invention relates generally to a monument for an aircraft with dual lavatories that are convertible to a PRM (persons with reduced mobility) lavatory.

BACKGROUND OF THE INVENTION

Due to the size of typical aircraft lavatories, it is often difficult for persons of reduced mobility to access the lavatory. The present invention provides an aircraft monument that includes dual lavatories that can be converted to a lavatory accessible a PRM.

SUMMARY OF THE PREFERRED EMBODIMENTS

In accordance with a first aspect of the present invention there is provided an aft complex that includes a lavatory monument assembly or lavatory section that is configured to be positioned in the interior of an aircraft and includes an enclosure that includes a front wall and a rear wall and that defines an enclosure interior. The lavatory section includes a divider wall that extends between the front wall and the rear wall. The divider wall includes a divider door that is movable between a closed position and an open position. In the closed position the divider door divides the enclosure interior into a first lavatory interior and a second lavatory interior. The divider wall includes a first section and a second section and the divider door includes a first portion and a second portion that meet at an obtuse angle. The divider door is pivotably attached to the divider wall. The front wall includes a first lavatory door that is movable between a closed and an open position and provides access to the first lavatory interior, and a second lavatory door that is movable between a closed and an open position and provides access to the second lavatory interior. A first toilet is positioned adjacent the rear wall in the first lavatory interior and a second toilet is positioned adjacent the rear wall in the second lavatory interior.

In a preferred embodiment, the second portion of the divider door is not parallel with the first section or the second section of the divider wall. Preferably, the second section of the divider wall is positioned between the first and second toilets and the first section of the divider wall is positioned between the first and second lavatory doors, and the divider door is hingedly connected to the second section of the divider wall. In a preferred embodiment, the first section of the divider wall is not aligned with the second section of the divider wall. In other words, a plane bifurcating the first section is not co-planar with a plane bifurcating the second section. Preferably, the first section of the divider wall and the second section of the divider wall extend parallel to one another. In another embodiment, the first section and second section can be non-parallel to one another. For example, the second section can extend at an angle (e.g., the same angle the second portion of the door makes with the first portion of the door).

In a preferred embodiment, the first portion of the divider door extends parallel to the first and second sections of the divider wall. Preferably, the second portion of the divider door does not extend parallel to the first and second sections of the divider wall. In a preferred embodiment, the first toilet is positioned closer to the front wall than the second toilet and the divider door pivots into the first lavatory interior to move to the open position. In another embodiment, the divider door can pivot into the second lavatory interior.

In accordance with another aspect of the present invention there is provided a method of operating a lavatory monument assembly that includes a front wall, a rear wall and a divider wall that extends between the front wall and the rear wall to divide the lavatory monument assembly into first and second lavatory interiors. The method includes moving a first lavatory door from a closed position to an open position to provide a first lavatory door opening, moving a divider door from a closed position to an open position to provide a divider door opening, moving a wheelchair through the first lavatory door opening and into the first lavatory interior, and moving the wheelchair at least partially through the divider door opening such that the wheelchair is positioned partially in the first lavatory interior and partially in the second lavatory interior. The divider door includes a first portion and a second portion that meet at an obtuse angle.

In a preferred embodiment, a first toilet is positioned adjacent the rear wall in the first lavatory interior, a second toilet is positioned adjacent the rear wall in the second lavatory interior, the second section of the divider wall is positioned between the first and second toilets and the first section of the divider wall is positioned between the first and second lavatory doors. The divider door is hingedly connected to the second section of the divider wall, and the divider door is pivoted toward the first toilet. Preferably, the first toilet is positioned closer to the front wall than the second toilet and in the open position the second portion of the divider door partially defines an angled entry path.

The present invention provides a monument that is configured to positioned in the aft of an aircraft and that is designed to both save and create space within the aircraft. By creating space compared to typical aircraft layouts further seats can be added. In a preferred embodiment, the monument (sometimes referred to herein as an aft complex) includes dual lavatories that can be converted to a lavatory accessible a PRM. Preferably, the aft complex also includes a galley portion and a deployable cabin attendant seat (CAS).

In a preferred embodiment, the aft complex is used in a single aisle (narrow body) aircraft. However, in another embodiment in can be used in a two aisle (wide body) aircraft. In a more preferred embodiment, the aft complex is intended to be used in an Airbus A220 cabin. Compared to the current A220 cabin layout (shown in FIG. 1) with implementation of the present invention, a row that includes five seats can be added by use of the inventive aft complex. As shown in FIG. 1, the current A220 cabin layout includes an aft monument with a galley and two outboard lavatories positioned forward of the aft exit doors 102 of the aircraft 100. With the present invention, by moving the two lavatories to the aft complex, an extra row of seats (see FIG. 2) can be added wear the lavatories in FIG. 1 formerly were.

U.S. Pat. No. 9,045,231, issued Jun. 2, 2015 is incorporated by reference herein in its entirety.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
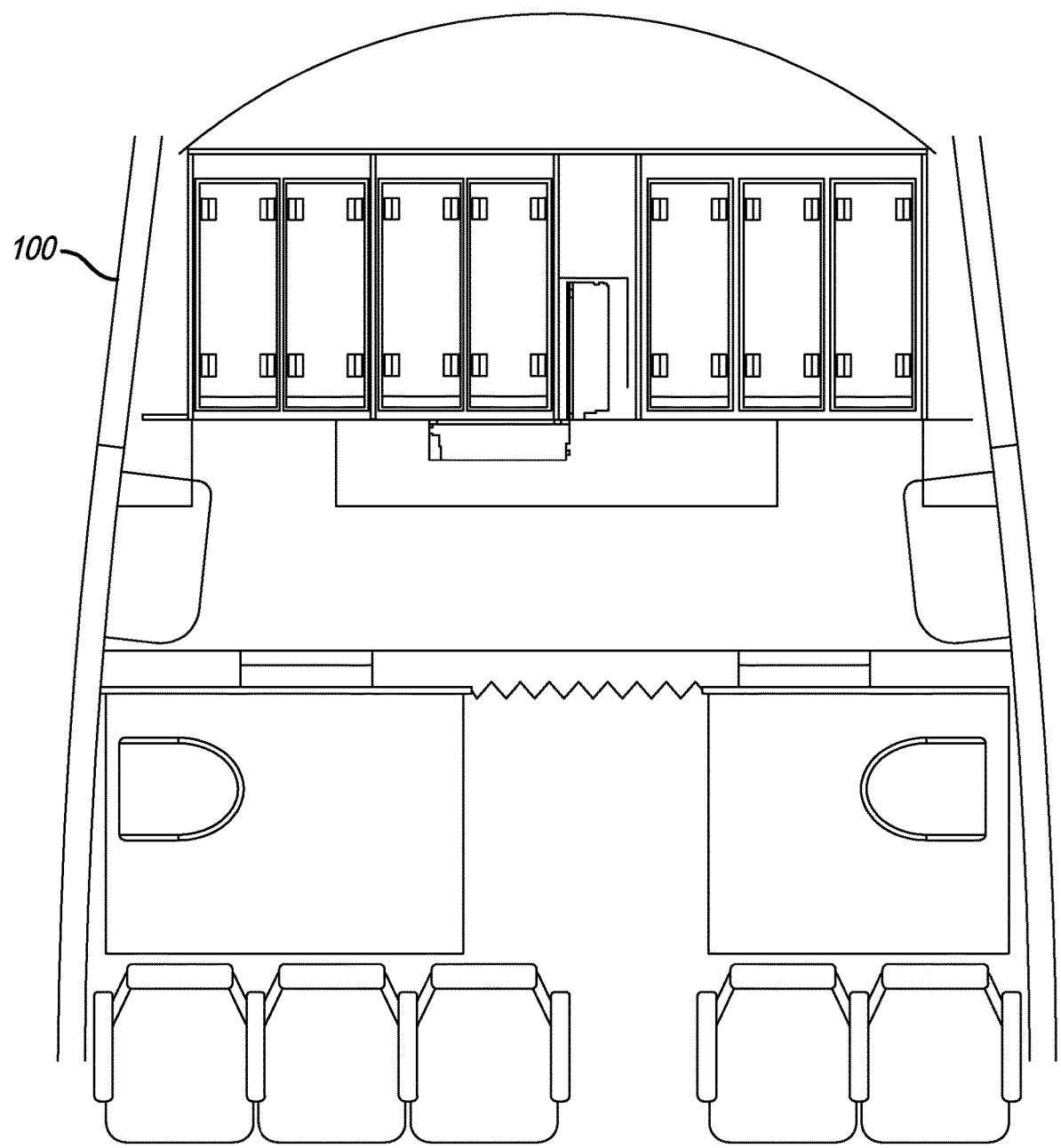
FIG. 1 is a plan view of the rear of an A220 aircraft showing a prior art layout.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way.

Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Figure 2:
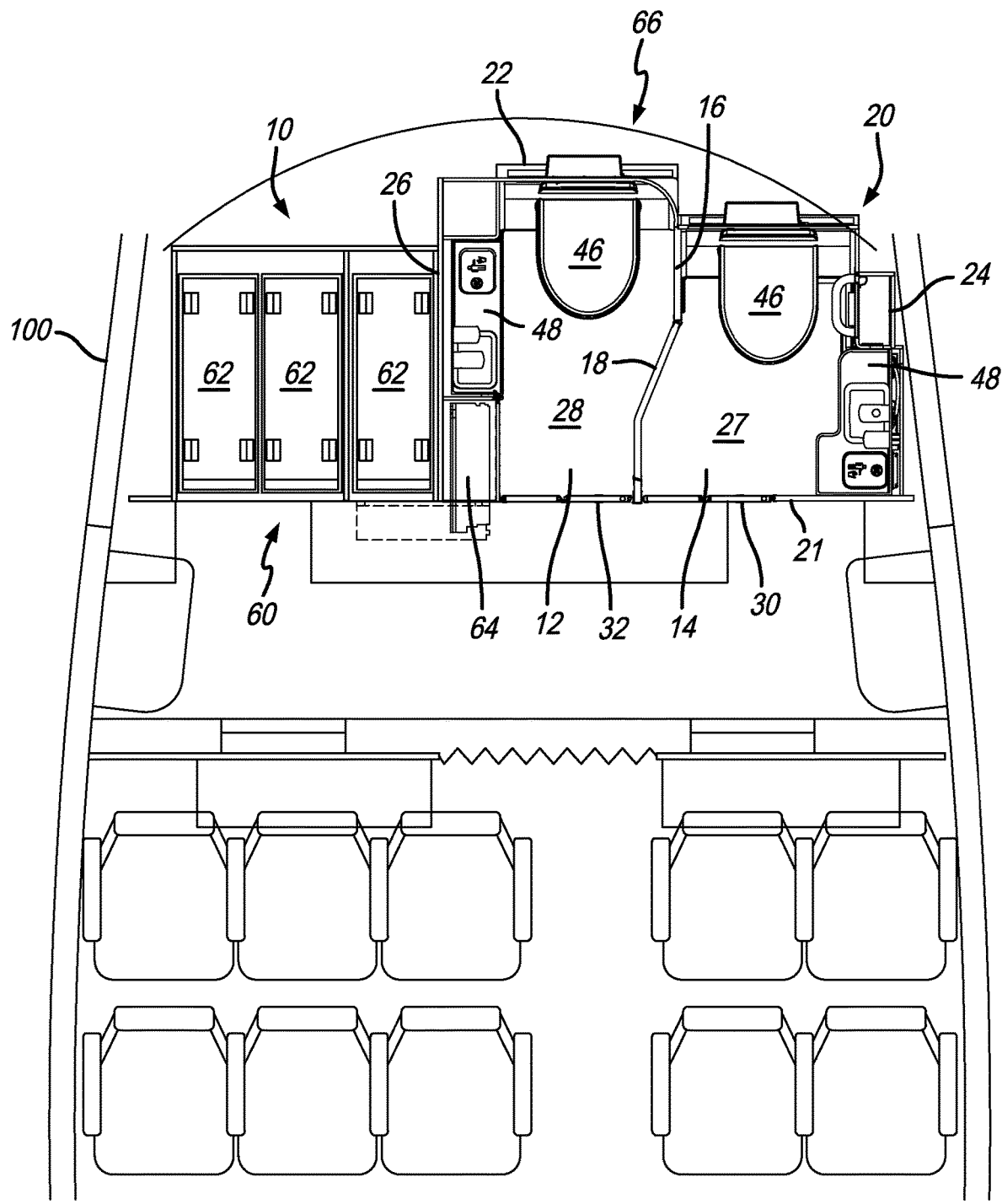
FIG. 2 is a plan view of a monument assembly with a PRM lavatory in accordance with a preferred embodiment of the present invention.

Referring now to the drawings, wherein the showings are for purposes of illustrating the present invention and not for purposes of limiting the same, FIGS. 2-4C show a monument assembly 10 that includes PRM lavatory access. As shown in FIG. 2, the monument assembly includes first and second lavatories 12 and 14 with a divider wall 16 there between and the ability to combine the two lavatory interior spaces by moving a divider door 18 to provide access for persons of reduced mobility who are usually confined to a wheelchair.

In particular, the present invention is contemplated for use on commercial passenger aircraft 100, as shown in FIG. 2. However, this is not a limitation on the present invention and the lavatory assembly can be used elsewhere. The monument assembly 10 shown in the figures is configured to be positioned such that the first and second lavatories 12 and 14 are positioned on the left or port side of an aircraft facing forward. However, it will be appreciated that a monument assembly that is a mirror image of the monument assembly 10 described herein with the first and second lavatories 12 and 14 positioned on the right side of the aircraft facing forward is within the scope of the present invention. The monument assembly 10 can also be positioned such that it faces aft or such that it faces left or right when positioned within the aircraft. Any orientation or positioning of the aircraft is within the scope of the present invention.

As shown in FIG. 2, the monument assembly 10 includes a galley portion 60 that includes space for trolley carts 62 and a cabin attendant seat 64 that is movable between a stowed position (shown in solid lines in FIG. 2) and a deployed position (shown in hidden lines in FIG. 2).

In a preferred embodiment, the lavatory section 66 of the monument assembly 10 comprises an enclosure 20 that includes a plurality of walls and defines an enclosure interior 19. In a preferred embodiment, the enclosure 20 includes a front wall 21, rear wall 22, and first and second side walls 24 and 26. It will be appreciated that the "walls" are not necessarily flat. For example, the portion of the rear wall 22 behind the toilet in the first lavatory is further forward than the portion of the rear wall 22 behind the toilet in the second lavatory. The divider wall 16 extends between the front and rear walls 20 and 22 and includes the divider door 18, which is movable between a closed position (see FIGS. 2 and 3) and an open position (see FIGS. 4A-4C), and, when in the closed position, divides the enclosure interior 19 into a first lavatory interior 27 and a second lavatory interior 28. The front wall 21 includes a first lavatory door 30 that is movable between an open and a closed position and provides access to the first lavatory interior 27 and a second lavatory door 32 that is movable between an open and a closed position and provides access to the second lavatory interior 28. It will be appreciated by those of skill in the art that the first and second lavatory doors 30 and 32 can be any type of door. For example, FIGS. 2-4C show the first and second lavatory doors 30 and 32 as double panel, bi-fold or flappy doors. In another embodiment the doors can be single panel or blade doors.

As shown in the figures, the monument assembly 10 preferably includes toilets 46, sinks 48 and other components typically present in aircraft lavatories. However, none of these components are limitations on the present invention. In a preferred embodiment, the toilet 46 in the first lavatory 12 is positioned forwardly of the toilet 46 in the second lavatory 14. However, this is not a limitation on the present invention.

Figure 3:
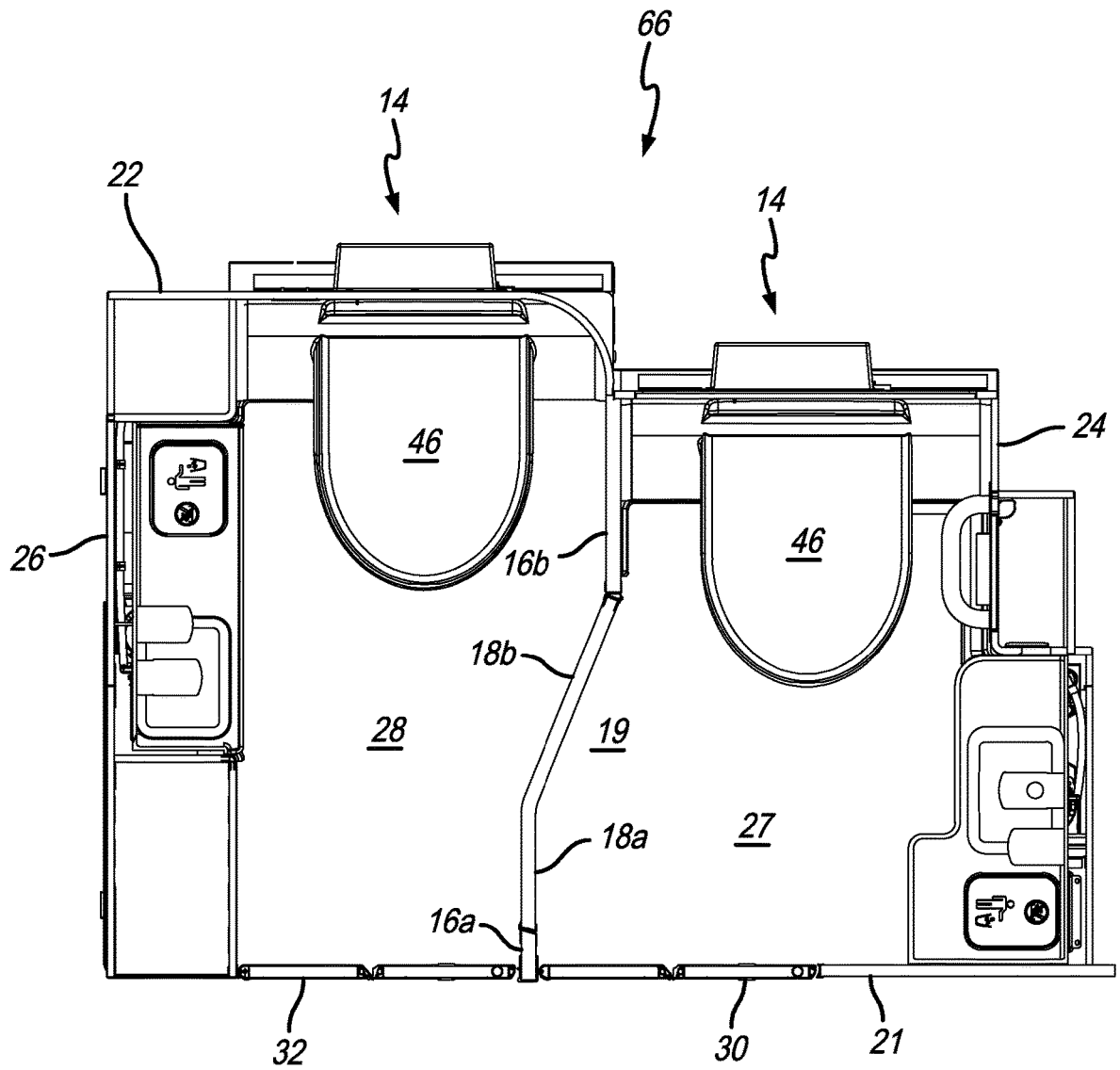
FIG. 3 is a plan view of the PRM lavatory of FIG. 2.
Figure 4A:
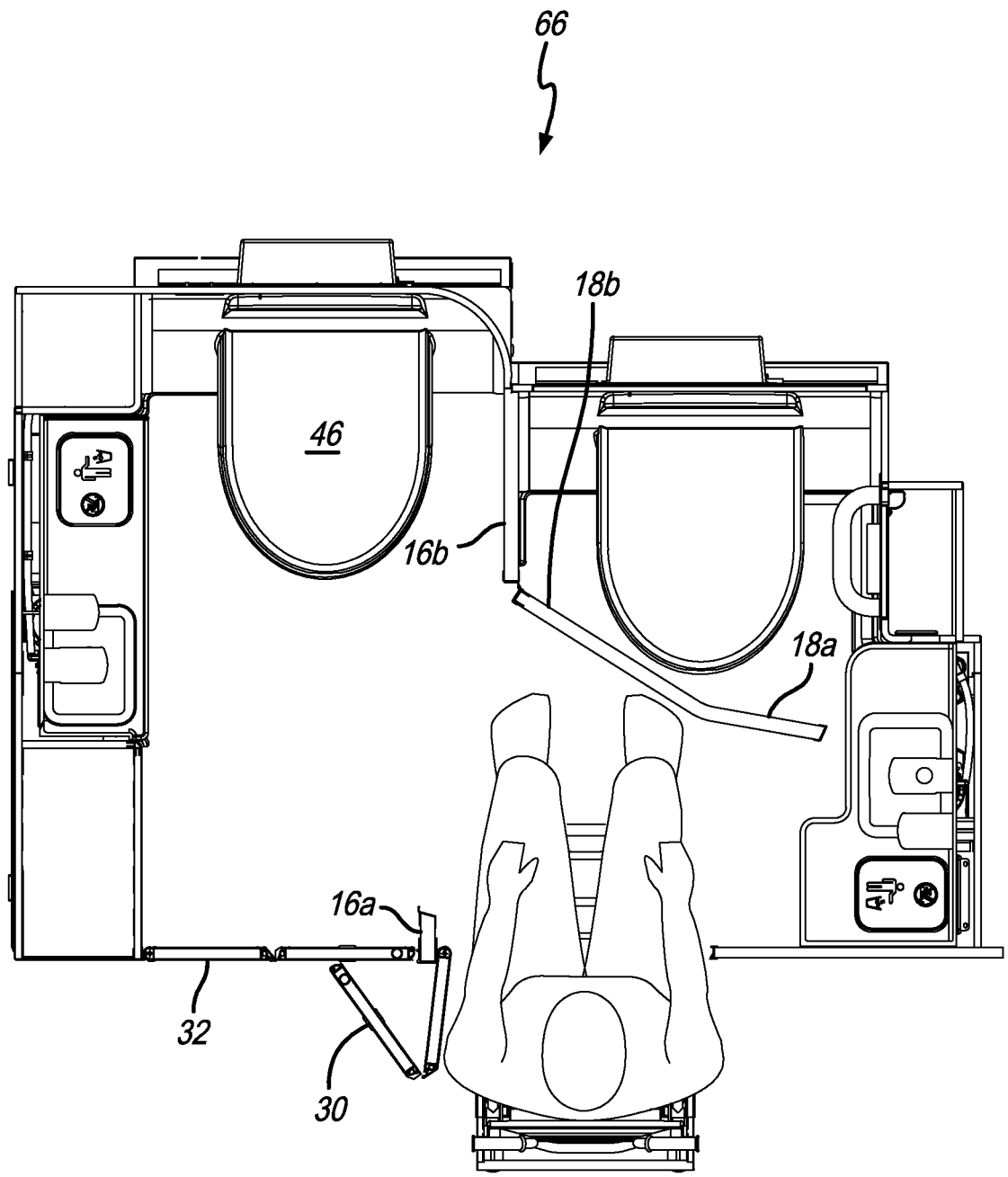
FIGS. 4A-4C are a series of plan views showing a person in a wheelchair accessing the PRM lavatory.
Figure 4B:
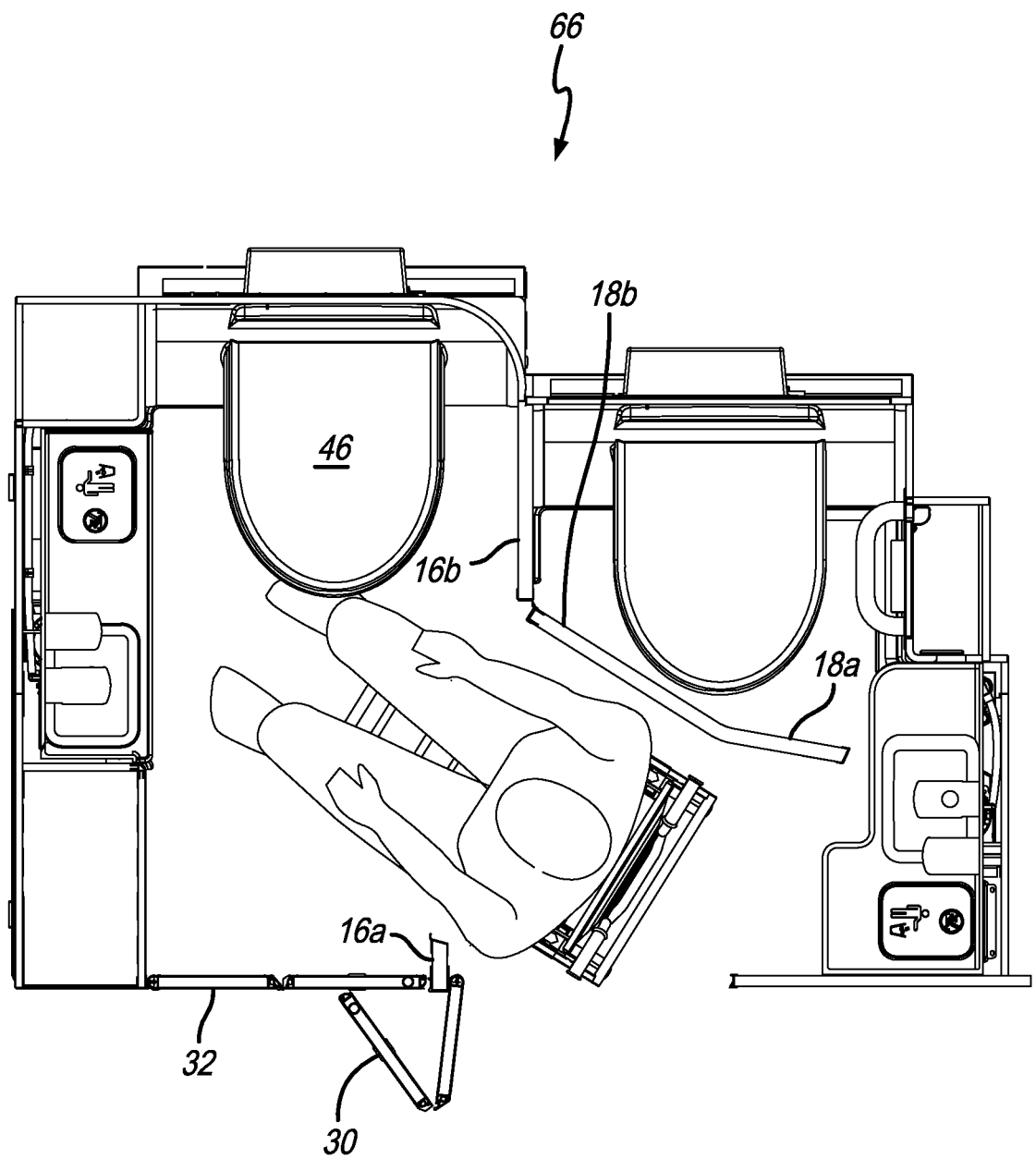
Figure 4C:
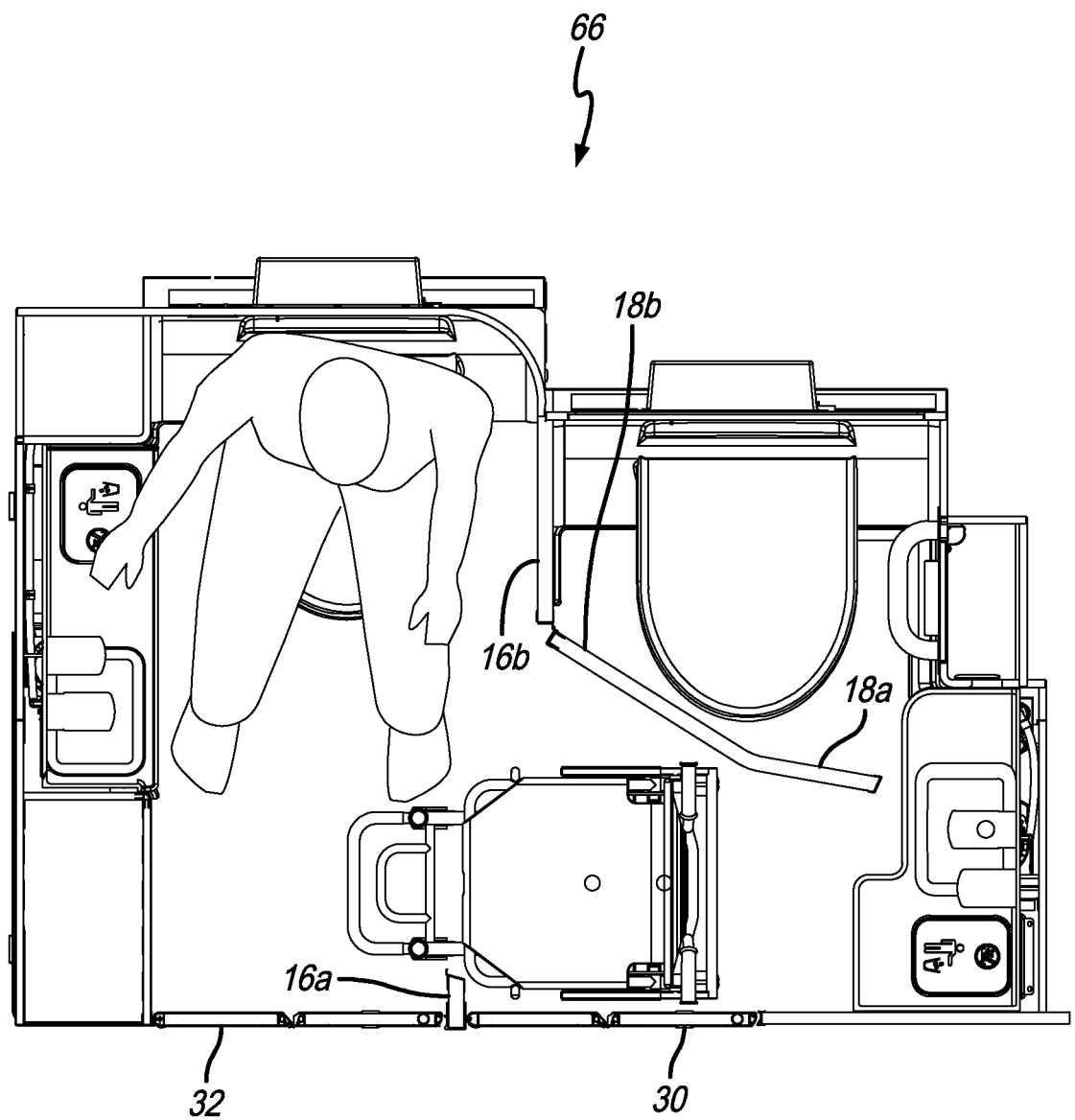

As is shown in FIGS. 2 and 3, when the divider door 18 is in the closed position, the first and second lavatories 12 and 14 are separate. In this configuration (the "separate lavatory" configuration), the first and second lavatories 12 and 14 are usable separately and the first lavatory 12 is accessible by the first lavatory door 30 and the second lavatory 14 is accessible by the second lavatory door 32. FIGS. 4A-4C shown the divider door 18 in the open position (the "combined lavatory" configuration). In a preferred embodiment, the divider door 18 includes first and second portions 18a and 18b that meet at an angle and divider wall 16 includes a first section 16a that is connected to and extends from the front wall 21 and a second section 16b that extends from the rear wall 22. To accommodate the angle in the divider door 18, the first and second sections 16a and 16b of the divider wall 16 are not aligned. As shown in FIG. 2, in a preferred embodiment, the first portion 18a of the divider door 18 extends parallel to the first section 16a and the second portion 18b of the divider door 18 angles away from the first portion 18a and to the second section 16b. The second portion 18b is preferably not parallel to either the first or second section 16a and 16b of the divider wall 16. Preferably, the first and second portions form an obtuse angle with one another and are not movable with respect to one another (i.e., they are not a bifold door). However, in another embodiment, the divider door can be a bi-fold door.

FIGS. 4A-4C show a PRM accessing the lavatory section 66. As shown in FIG. 4A, first the first lavatory door 30 is opened. In a preferred embodiment, the first lavatory door 30 opens outwardly so that it does not get in the way of the divider door 18. Next, the divider door 18 is opened, as shown in FIG. 4A.

In a preferred embodiment, the divider door is pivoted outboard to the open position, such that the second section 18b of the divider door is positioned against or adjacent to the toilet in the first lavatory. Preferably, the first portion 18a is angled toward the toilet, which provides further space or clearance as the wheelchair enters, as shown in FIG. 4B. With the toilet 46 in the first lavatory 12 being positioned forwardly of the toilet 46 in the second lavatory 14, when the divider door 18 is in the open position, the second portion 18b partially defines an angled entry path, as shown in FIG. 4B.

As shown in FIG. 4C, after the wheelchair has gone through the opening provided by the divider door 18, they can then transfer onto the toilet 46. During this process the second lavatory door 32 can remain closed because the opening provided in the front wall 21 by the first lavatory door 30 is large enough to provide access to a person in a wheelchair.

It will be appreciated that the lavatory section 66 of the monument assembly 10 can be implemented in an aircraft as a standalone monument (as is shown in FIG. 3).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used. Further, any specific materials noted herein are only examples: alternative implementations may employ differing materials.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A lavatory monument assembly configured to be positioned in an interior of an aircraft, the lavatory monument assembly comprising: an enclosure that includes a front wall and a rear wall and that defines an enclosure interior, a divider wall that extends between the front wall and the rear wall, wherein the divider wall includes a divider door that is movable between a closed position and an open position, wherein in the closed position the divider door divides the enclosure interior into a first lavatory interior and a second lavatory interior, wherein the divider wall includes a first section and a second section, wherein the divider door includes a first portion and a second portion that meet at an obtuse angle, wherein the first portion is stationary with respect to the second portion, and wherein the divider door is pivotably attached to the divider wall, wherein the front wall comprises a first lavatory door that is movable between a closed and an open position and provides access to the first lavatory interior, a second lavatory door that is movable between a closed and an open position and provides access to the second lavatory interior, and wherein a first toilet is positioned adjacent the rear wall in the first lavatory interior and a second toilet is positioned adjacent the rear wall in the second lavatory interior.

2. The lavatory monument assembly of claim 1 wherein the second portion of the divider door is not parallel with the first section or the second section of the divider wall.

3. The lavatory monument assembly of claim 1 wherein the second section of the divider wall is positioned between the first and second toilets and the first section of the divider wall is positioned between the first and second lavatory doors, wherein the divider door is hingedly connected to the second section of the divider wall.

4. The lavatory monument assembly of claim 1 wherein the first section of the divider wall is not aligned with the second section of the divider wall.

5. The lavatory monument assembly of claim 4 wherein the first section of the divider wall and the second section of the divider wall extend parallel to one another.

6. The lavatory monument assembly of claim 5 wherein the first portion of the divider door extends parallel to the first and second sections of the divider wall.

7. The lavatory monument assembly of claim 6 wherein the second portion of the divider door does not extend parallel to the first and second sections of the divider wall.

8. The lavatory monument assembly of claim 3 wherein the first toilet is positioned closer to the front wall than the second toilet, wherein the divider door pivots into the first lavatory interior to move to the open position.

9. A method of operating a lavatory monument assembly that includes a front wall, a rear wall and a divider wall that extends between the front wall and the rear wall to divide the lavatory monument assembly into first and second lavatory interiors, the method comprising the steps of:
   (a) moving a first lavatory door from a closed position to an open position to provide a first lavatory door opening,
   (b) moving a divider door from a closed position to an open position to provide a divider door opening, wherein the divider door includes a first portion and a second portion that meet at an obtuse angle, wherein the first portion is stationary with respect to the second portion,
   (c) moving a wheelchair through the first lavatory door opening and into the first lavatory interior, and
   (d) moving the wheelchair at least partially through the divider door opening such that the wheelchair is positioned partially in the first lavatory interior and partially in the second lavatory interior.

10. The method of claim 9 wherein the divider wall includes a first section and a second section, and wherein the second portion of the divider door is not parallel with the first section or the second section of the divider wall.

11. The method of claim 10 wherein a first toilet is positioned adjacent the rear wall in the first lavatory interior and a second toilet is positioned adjacent the rear wall in the second lavatory interior, wherein the second section of the divider wall is positioned between the first and second toilets and the first section of the divider wall is positioned between the first and second lavatory doors, wherein the divider door is hingedly connected to the second section of the divider wall, and wherein the step (b) includes pivoting the divider door toward the first toilet.

12. The method of claim 11 wherein the first toilet is positioned closer to the front wall than the second toilet, wherein in the open position the second portion of the divider door partially defines an angled entry path.

13. A lavatory monument assembly configured to be positioned in an interior of an aircraft, the lavatory monument assembly comprising:
   an enclosure that includes a front wall and a rear wall and that defines an enclosure interior,
   a divider wall that extends between the front wall and the rear wall, wherein the divider wall includes a divider door that is movable between a closed position and an open position, wherein in the closed position the divider door divides the enclosure interior into a first lavatory interior and a second lavatory interior, wherein the front wall comprises a first lavatory door that is movable between a closed and an open position and provides access to the first lavatory interior, a second lavatory door that is movable between a closed and an open position and provides access to the second lavatory interior, wherein a first toilet is positioned adjacent the rear wall in the first lavatory interior and a second toilet is positioned adjacent the rear wall in the second lavatory interior,
   wherein the divider wall includes a first section and a second section, wherein the divider door includes a first portion and a second portion that meet at an obtuse angle, wherein the first portion is stationary with respect to the second portion, wherein the second section of the divider wall is positioned between the first and second toilets and the first section of the divider wall is positioned between the first and second lavatory doors, wherein the divider door is hingedly connected to the second section of the divider wall, wherein the first section of the divider wall is not aligned with and extends parallel to the second section of the divider wall, wherein the first portion of the divider door extends parallel to the first and second sections of the divider wall, and wherein the second portion of the divider door does not extend parallel to the first and second sections of the divider wall.

14. The lavatory monument assembly of claim 13 wherein the first toilet is positioned closer to the front wall than the second toilet, wherein the divider door pivots into the first lavatory interior to move to the open position.

* * * * *